(12) United States Patent
Erez et al.

(10) Patent No.: US 8,937,618 B2
(45) Date of Patent: Jan. 20, 2015

(54) GRAPHICAL REPRESENTATIONS OF CORPORATE NETWORKS

(75) Inventors: Tamir Erez, Rishon LeZion (IL); Evgeny Himmelreich, Lapid (IL)

(73) Assignee: SAP Portals Israel Ltd, Ra'anana (IL)

( * ) Notice: Subject to any disclaimer, the term of this patent is extended or adjusted under 35 U.S.C. 154(b) by 190 days.

(21) Appl. No.: 13/463,599

(22) Filed: May 3, 2012

(65) Prior Publication Data

US 2013/0293551 A1 Nov. 7, 2013

(51) Int. Cl.
*G06T 11/20* (2006.01)

(52) U.S. Cl.
USPC ......... 345/440; 715/215; 705/7.11; 705/7.13; 705/7.15; 705/7.17; 705/7.27

(58) Field of Classification Search
CPC ... G06T 11/206; G06F 3/0481; G06F 17/246; H04L 12/2458; G06Q 10/10
USPC ........ 345/440; 715/215; 705/7.11, 7.13, 7.15, 705/7.17, 7.27
See application file for complete search history.

(56) References Cited

U.S. PATENT DOCUMENTS

| | | | |
|---|---|---|---|
| 5,414,809 A * | 5/1995 | Hogan et al. .................. 715/765 |
| 7,620,856 B2 | 11/2009 | Kagan et al. | |
| 2003/0011601 A1* | 1/2003 | Itoh et al. ...................... 345/440 |
| 2004/0215793 A1* | 10/2004 | Ryan et al. ..................... 709/229 |
| 2005/0102316 A1* | 5/2005 | Lawson et al. ................ 707/102 |
| 2005/0151738 A1* | 7/2005 | Lord et al. ..................... 345/440 |
| 2008/0243811 A1* | 10/2008 | He et al. ............................ 707/5 |
| 2008/0301765 A1* | 12/2008 | Nicol et al. ....................... 726/1 |
| 2009/0122065 A1* | 5/2009 | Patil et al. ..................... 345/440 |
| 2011/0188405 A1* | 8/2011 | Mukherjea et al. ........... 370/254 |
| 2011/0252032 A1* | 10/2011 | Fitzgerald et al. ............ 707/737 |
| 2011/0276396 A1* | 11/2011 | Rathod ...................... 705/14.49 |
| 2012/0268467 A1* | 10/2012 | Madden et al. ............... 345/440 |
| 2012/0316903 A1* | 12/2012 | Pendergraft et al. ......... 705/7.11 |
| 2013/0106860 A1* | 5/2013 | De Pauw et al. .............. 345/440 |
| 2013/0135314 A1* | 5/2013 | Haggerty et al. ............. 345/440 |
| 2013/0155068 A1* | 6/2013 | Bier et al. ..................... 345/440 |
| 2013/0212479 A1* | 8/2013 | Willis et al. ................... 715/736 |

\* cited by examiner

*Primary Examiner* — Xiao Wu
*Assistant Examiner* — Todd Buttram
(74) *Attorney, Agent, or Firm* — Fish & Richardson P.C.

(57) ABSTRACT

Systems and methods for graphical representation of corporate networks are provided. The graphical representation may be used to present corporate information, e.g., corporate reporting structure, employee keywords, etc. The graphical representation may include nodes whose sizes are based on the corporate data, such as the number of direct reports, or frequencies of keywords appearances. The graphical representation may also include multi-layer corporation information. Further, the graphical representation may present a subset of corporate data in response to user inputs.

21 Claims, 6 Drawing Sheets

GRAPHICAL REPRESENTATIONS OF CORPORATE NETWORKS

TECHNICAL FIELD

This disclosure relates to graphical representations of corporate networks, and more particularly, to transforming corporate data into a graphical representation to facilitate network analysis of the data.

BACKGROUND

Corporate networks may store information related to employees, customers, or connections between them in databases. This information may be retrieved from internal corporate systems such as human resource systems, customer relationship management systems. A corporation may contain substantial volumes of data for internal applications or external communications. Due to the large amount of corporate data, it is often a challenge to gain insights about the corporation by analyzing the corporate data directly, especially for a large-scale corporate network.

SUMMARY

In one general implementation, a computer implemented method for corporate data analysis performed by one or more processors includes the steps of: receiving a set of data, the set of data including information about a corporation; and transforming the set of data into a graph representation, the graph representation including nodes whose properties are based on the set of data.

In some implementations, the set of data may be retrieved from an internal corporate system. The graphical representation may include at least one visible organizational anomaly. The set of data may include information about employee reporting relationships. The graphical representation may include nodes representing employees and the sizes of the nodes are based on the number of direct reports the employees have. In some implementations, the set of data may include information about keywords associated with employees. The graphical representation may include a set of nodes representing keywords and the sizes of the nodes are based on frequencies of appearances associated with the keywords. Further, the graphical representation may include multi-layer corporate information, where the multi-layer corporate information may include employee reporting information and employee keywords information. The graphical representation may also represent a subset of the set of data. Moreover, the method may further include receiving one or more user inputs for a particular graphical representation prior to transforming the set of data into the graphical representation, and processing the set of data based on the one or more user input.

Another general implementation includes a computer program product, tangibly embodied in a machine-readable storage device, operable to cause data processing apparatus to perform operations including: receiving a set of data, the set of data including information about a corporation; and transforming the set of data into a graph representation, which can be translated into graphical representation including nodes whose properties are based on the set of data.

In some implementations, the set of data may be retrieved from an internal corporate system. The graphical representation may include at least one visible organizational anomaly. The set of data may include information about employee reporting relationships. The graphical representation may include nodes representing employees and the sizes of the nodes are based on the number of direct reports the employees have. In some implementations, the set of data may include information about keywords associated with employees. The graphical representation may include a set of nodes representing keywords and the sizes of the nodes are based on frequencies of appearances associated with the keywords. Further, the graphical representation may include multi-layer corporate information, where the multi-layer corporate information may include employee reporting information and employee keywords information. The graphical representation may also represent a subset of the set of data. Moreover, the computer program product may be operable to cause data processing apparatus to further perform operations including receiving one or more user inputs for a particular graphical representation prior to transforming the set of data into the graphical representation, and processing the set of data based on the one or more user input.

The details of one or more implementations of the disclosure are set forth in the accompanying drawings and the description below. Other features, objects, and advantages of the disclosure will be apparent from the description and drawings, and from the claims.

DESCRIPTION OF DRAWINGS

Like reference symbols in the various drawings indicate like elements.

DETAILED DESCRIPTION

The present disclosure pertains to systems, methods, and computer program products for providing a graphical representation of a corporate network. Corporate data such as employee reporting relationships, employee keywords may be transformed into graphical representations. The graphical representation may include nodes whose sizes are based on the corporate data to facilitate visual characterizations of the corporate data. The graphical representation may also adapt to requests from users to present graphs that are in accordance with the user requests. As a result, the graphical representation would allow users to apply network analysis on the graph, e.g., to discover and understand corporate structure, corporate connections and trends which are visible from the graph.

Figure 1:
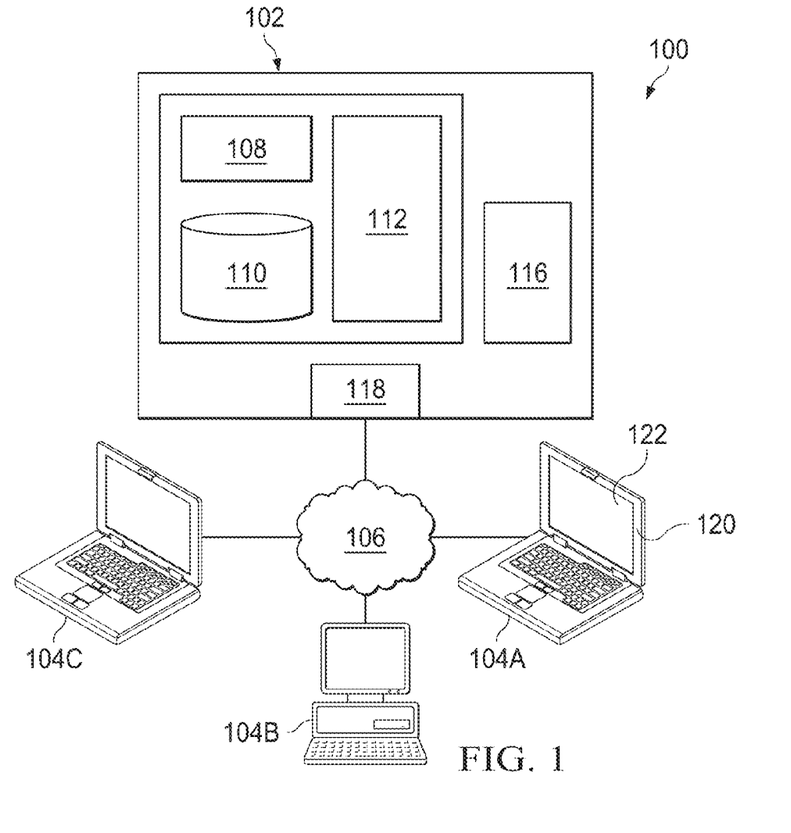
FIG. 1 is a block diagram of an example system for providing a graphical representation of a corporate network.

FIG. 1 is a block diagram of an example system 100 for providing a graphical representation of a corporate network. System 100 includes a server 102, and a client 104A. The server 102 and client 104A communicate across a network 106.

Server 102 includes a processor 114. Processor 114 may execute a data processing module 108 and a rendering engine 112. Processor 114 can be, for example, a central processing unit (CPU), a blade, an application specific integrated circuit (ASIC), or a field-programmable gate array (FPGA), or other type of processor. Although FIG. 1 illustrates a single processor 114 in server 102, multiple processors may be used according to particular needs, and reference to processor 114 is meant to include multiple processors where applicable.

Data processing module 108 processes data of a corporate network for graphical representations. The data processing module 108 may receive inputs from client 104A across the network 106, regarding a particular graphical representation of a corporate network. The data processing module 108 may make use of corporate data stored in memory 110. The data processing module 108 may also retrieve corporate data from corporate database 116. The data processing module 108 may pre-process the corporate data according to user inputs. For example, the data processing module 108 may filter out irrelevant corporate data for the graphical representation according to conditions defined in user inputs.

Corporate database 116 may be configured to store corporate information (e.g., employee, customer, and sales) associated with the corporate network. A database is an organized collection of data in digital form. In some implementations, the corporate database 116 may contain information of the corporate human resource (HR) system, corporate email system, customer relation management system, or other internal corporate systems.

Processor 114 may also execute a rendering engine 112 on the server 102. Rendering engine 112 renders a visualization of large-scale complex networks as a graph that takes into account priority, frequency, relevancy, and group association. The rendering engine 112 makes use of data stored in memory 110, corporate database 116, or received across network 106 from client 104A. The rendering engine 112 may present nodes or lines with different sizes or colors on the graphical representation based on the corporate data. The rendering engine 112 may keep track of navigation history to enhance the browsing experience throughout different sub-networks, for example, by allowing the user to go back and forth between recently viewed corporate network graphical representations. The rendering engine 112 may customize the graphical representation by zooming in or out specific nodes selected by the user, showing desired nodes for the user and filtering out nodes with irregular patterns, and/or displaying the graphical representation on specific viewing background selected by the user.

Server 102 may be any computer or processing device such as a mainframe, a blade server, general-purpose personal computer (PC), Macintosh®, workstation, UNIX-based computer, or any other suitable device. Generally, FIG. 1 provides merely one example of computers that may be used with the disclosure. In other words, the present disclosure contemplates computers other than general purpose computers, as well as computers without conventional operating systems. The term "computer" is intended to encompass a personal computer, workstation, network computer, mobile computing device, or any other suitable processing device. For example, although FIG. 1 illustrates one server 102 that may be used with the disclosure, system 100 can be implemented using computers other than servers, as well as a server pool. Server 102 may be adapted to execute any operating system including z/OS, Linux-Intel® or Linux/390, UNIX, Windows Server, or any other suitable operating system. According to one implementation, server 102 may also include or be communicably coupled with a web server and/or an SMTP server.

Server 102 may also include interface 118 for communicating with other computer systems, such as client 104A, over network 106 in a client-server environment or any other type of distributed environment. In certain implementations, server 102 receives requests for data access from local or remote senders through interface 118 for storage in memory 110 and/or processing by processor 114. Generally, interface 118 comprises logic encoded in software and/or hardware in a suitable combination and operable to communicate with network 106. More specifically, interface 118 may comprise software supporting one or more communication protocols associated with communications network 106 or hardware operable to communicate physical signals.

Memory 110 may include any memory or database module and may take the form of volatile or non-volatile memory including, without limitation, magnetic media, optical media, random access memory (RAM), read-only memory (ROM), removable media, or any other suitable local or remote and/or distributed memory and retrieved across a network, such as in a cloud-based computing environment.

Network 106 facilitates wireless or wireline communication between computer server 102 and any other local or remote computer, such as client 104A. Network 106 may be all or a portion of an enterprise or secured network. In another example, network 106 may be a VPN merely between server 102 and client 104A across a wireline or wireless link. Such an example wireless link may be via 802.11a, 802.11b, 802.11g, 802.11n, 802.20, WiMax, and many others. The wireless link may also be via cellular technologies such as the 3rd Generation Partnership Project (3GPP) Global System for Mobile Communications (GSM), Universal Mobile Telecommunications System (UMTS), Long Term Evolution (LTE), etc. While illustrated as a single or continuous network, network 106 may be logically divided into various sub-nets or virtual networks without departing from the scope of this disclosure, so long as at least portion of network 106 may facilitate communications between senders and recipients of requests and results. In other words, network 106 encompasses any internal and/or external network, networks, sub-network, or combination thereof operable to facilitate communications between various computing components in system 100. Network 106 may communicate, for example, Internet Protocol (IP) packets, Frame Relay frames, Asynchronous Transfer Mode (ATM) cells, voice, video, data, and other suitable information between network addresses. Network 106 may include one or more local area networks (LANs), radio access networks (RANs), metropolitan area networks (MANs), wide area networks (WANs), all or a portion of the global computer network known as the Internet, and/or any other communication system or systems at one or more locations. In certain implementations, network 106 may be a secure network associated with the enterprise and remote clients 104A-C.

System 100 allows for a client, such as client 104A, to view a graphical representation of information related to a corporate network. System 100 may include more clients 104B and 104C. The server 102 and clients 104B-C communicate across a network 106. Clients 104A-C may request to view a graphical representation of corporate information to server 102. Clients 104A-C may also define conditions or constraints for the graphical representation in the requests. Clients 104A-C may further apply network analysis on the graphical representation to gain insights about the corporation.

It will be understood that there may be any number of clients 104A communicably coupled to server 102. This disclosure contemplates that many clients may use a computer or that one user may use multiple computers to submit or review queries via a graphical user interface (GUI) 122. As used in this disclosure, clients may operate remote devices, such as personal computers, touch screen terminals, workstations, network computers, kiosks, wireless data ports, wireless or wireline phones, personal data assistants (PDAs), one or more processors within these or other devices, or any other suitable processing device, to execute operations associated with business applications. For example, client 104A may be a PDA operable to wirelessly connect with an external or unsecured network. In another example, client 104A may comprise a laptop that includes an input device, such as a keypad, touch screen, mouse, or other device that can accept information, and an output device that conveys information associated with the operation of server 102 or client 104A, including digital data, visual information, or GUI 122. For example, rendering engine 112 may provide a graphical representation of corporate data, which can be displayed to a user on a display 120 that displays a GUI 122 through which the user can view, manipulate, edit, etc., the graph of corporate data. Both the input device and output device may include fixed or removable storage media such as a magnetic computer disk, CD-ROM, or other suitable media to both receive input from and provide output to users of client 104A through the display 120, namely over GUI 122.

GUI 122 includes a graphical user interface operable to allow the user of client 104A to interface with at least a portion of system 100 for any suitable purpose, including viewing, manipulating, editing, etc., graphic visualizations of user profile data. Generally, GUI 122 provides the user of client 104A with an efficient and user-friendly presentation of data provided by or communicated within system 100. GUI 122 may comprise a plurality of customizable frames or views having interactive fields, pull-down lists, and buttons operated by the user. In one implementation, GUI 122 presents information associated with queries and buttons and receives commands from the user of client 104A via one of the input devices. Moreover, it should be understood that the terms graphical user interface and GUI may be used in the singular or in the plural to describe one or more graphical user interfaces and each of the displays of a particular graphical user interface. Therefore, GUI 122 contemplates any graphical user interface, such as a generic web browser or touch screen, which processes information in system 100 and efficiently presents the results to the user. Server 102 can accept data from client 104A via the web browser (e.g., Microsoft® Internet Explorer or Mozilla® Firefox) and return the appropriate HTML or XML responses using network 106. For example, server 102 may receive a request from client 104A using a web browser or application-specific graphical user interface, and then may execute the request to store and/or retrieve information pertaining to corporate data.

The workflow described above may also allow offline analysis on client machines such as 104A. In order to support offline analysis, aggregated data may be prepared on the server according to user input or required filters and moved to the client machines over network 106, magnetic or optical media or any other means of transporting electronic data. This data will then be stored in a location accessible to the client devices or on the devices themselves for use with locally installed analysis tools and GUI even without any additional communication with the servers holding the original data.

Figure 2:
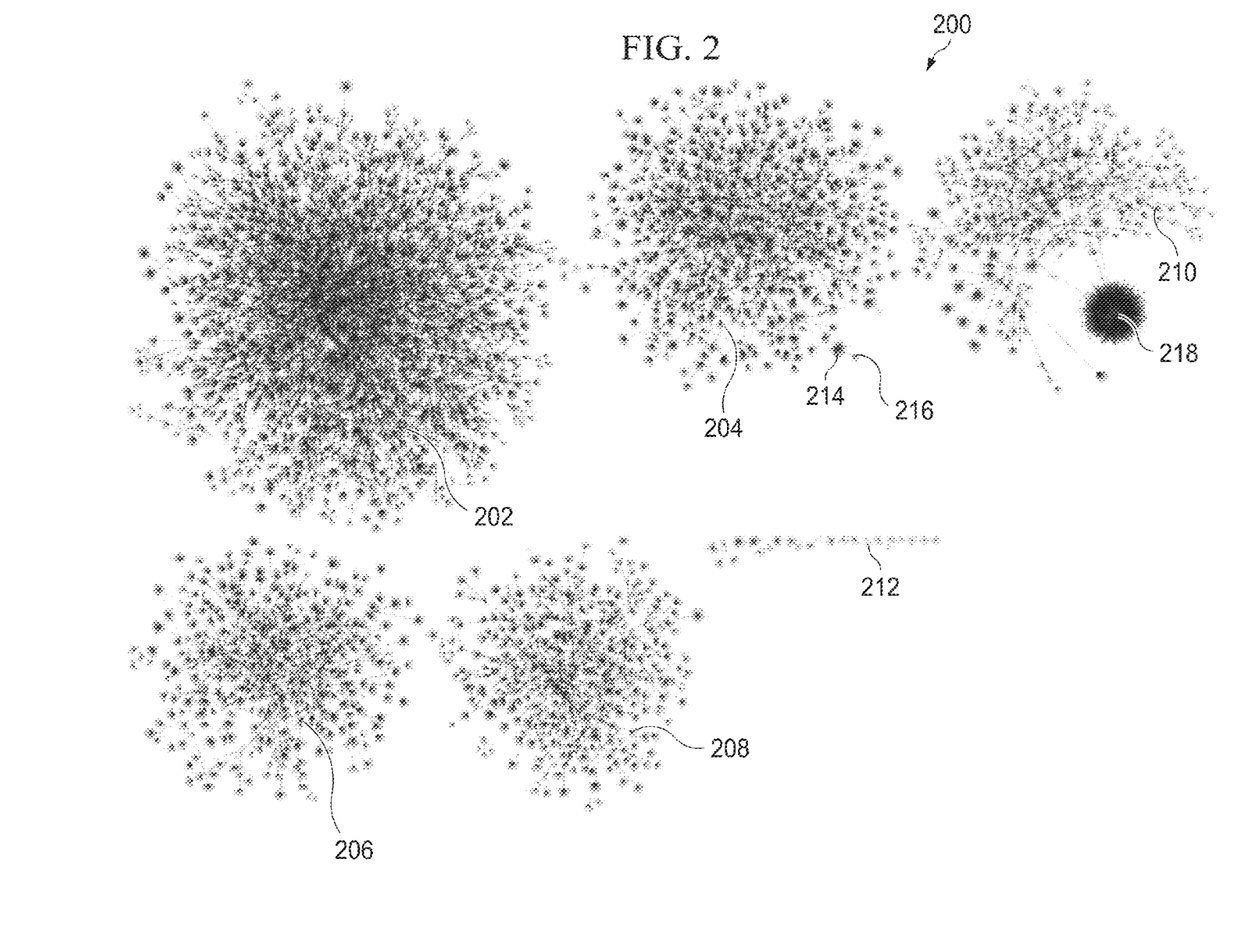
FIG. 2 is an example graph representing employee reporting relationships of a corporate network.

FIG. 2 is an example graph 200 representing employee reporting relationships of a corporate network. As shown in FIG. 2, each node represents an employee. The illustrated graph 200 contains a number of nodes, representing a number of employees in the corporate network. Each node is connected with another node in a solid line, representing a direct reporting relationship between the employees associated with the nodes. As shown in FIG. 2, the graphical representation of the corporate network includes 5 node clusters 202-210. Each node cluster represents a board member or department in the corporate organization. Thus the high-level corporate structure is evident from the graphical representation 200. Furthermore, it can be recognized from the graphical representation that there are a group of nodes 212 which are isolated from other nodes on the graph 200. The isolated nodes 212 are disconnected with other nodes, suggesting that a group of employees are isolated from the rest of corporation. Hence, the graphical representation of the corporate network would bring this issue to the attention of a person who is reviewing the graph, e.g., an executive officer, a member of board of directors, or a strategic decision maker of a corporation. The graphical representation effectively visualizes the corporate network in a way that potential issues with corporate structure may be identified by the user with ease.

It can be seen in FIG. 2 that nodes on the graph 200 have different sizes. In this example graph, the size of the node represents the number of direct reports for the person associated with the node. The more people directly reporting to the person associated with the node, the larger size the node would be on the graph. For example, an employee with 10 direct reports may show up in the graph as a larger node than an employee with no direct report. As shown in FIG. 2, node 214 is of larger size than node 216, indicating that the employee associated with node 214 has more direct reports than the employee associated with node 216. In some implementations, different colors may be used for nodes of different sizes. Therefore, the user can grasp the general corporate reporting structure by glancing at the graph presentation of the corporate network.

As shown in FIG. 2, node 218 has an exceptional large size which is instantly notable to the user of the graph 200. The exceptional size of node 218 represents that over thousands of employees directly report to a single manager in the corporation, i.e., node 218. This outstanding phenomenon may be undesirable in corporate organizations and it would be worth to be noted. In some implementations, a different color may be used to represent the node with exceptional size or outstanding phenomenon in order to highlight the issue. As such, an organizational anomaly in the existing corporate structure may be indicated to the user of the graphical representation. The employee name of the large size node 218 may also be shown on the graph to provide more information about the node with exceptional behavior or pattern.

In some implementations, the user of the graphical representation can hover over a node using a mouse pointer or other input interface device. Hovering over a node can reveal information about the node (e.g., employee name, title, department, direct manager). Nodes shown on the graph may be moved by the user using an input interface device, such as a mouse or a finger touch or other input, on the graph interface to view node information obscured by other nodes. Further, dynamic node clustering may be performed for fitting the output graph to the viewport available size. A zoom bar can also be shown on the graphical representation to control the number of clusters or nodes shown on each page. For example, the node cluster 202 can be selected and expanded and the graph may be re-rendered to show the nodes in node cluster 202. The arrangement of nodes and current viewing options selected by the user can be persisted for each instantiation of the graph.

Figure 3:
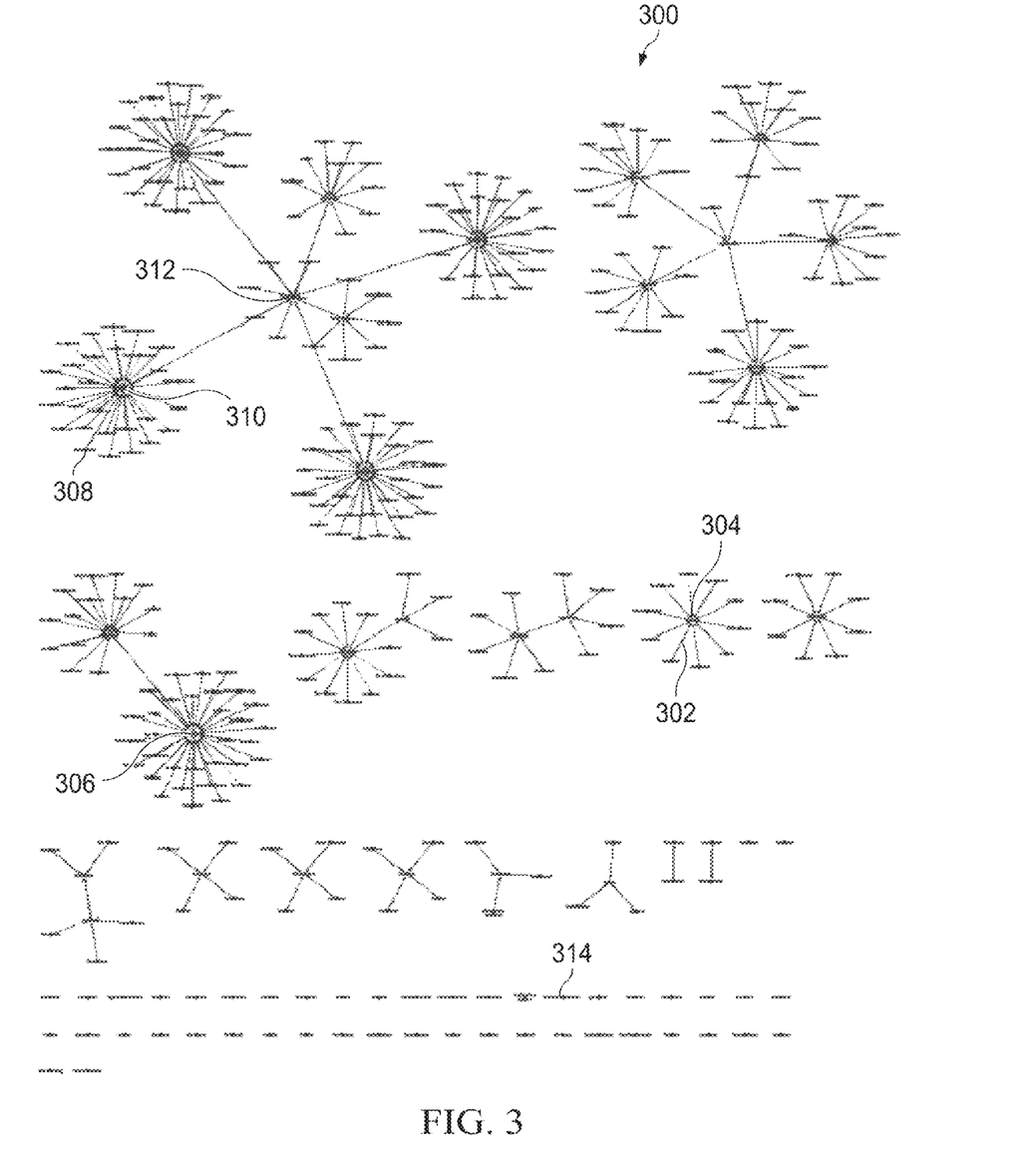
FIG. 3 is an example graph representing a sub-organization of a corporate network.

FIG. 3 is an example graph 300 representing a sub-organization of a corporate network. As shown in FIG. 3, each node on the graph 300 represents an employee of the sub-organization of the corporate network. Each node is connected with the node representing the person the employee directly reports to in a solid line. Because the number of employees of the sub-organization is usually smaller than the corporation, graphical representation of the sub-organization may provide a detailed view of the structure of the sub-organization. The numbers of employees directly reporting to the nodes may be readily identified from the graph. For example, node cluster 302 includes 10 nodes connecting with a center node 304, representing that 10 employees directly report to the person associated with node 304. The hierarchy of the reporting relationship may also be understood from the graph. As shown in FIG. 3, node 308 is connected with node 310, representing that the employee associated with node 308 directly reports to the person associated with node 310. Node 310 in turn is connected with node 312, representing that the person associated with node 310 directly reports to the person associated with node 312. In other words, the person associated with node 308 is at two levels lower than the person associated with node 312 in the corporate management chart. Thus, the reporting structure of the sub-organization may be visualized and be conveyed to the user in an intuitive manner through the graphical representation. In some implementations, the solid line connecting the nodes may be presented in different colors or weights based on the accountability level of the nodes, allowing the user of the graph to learn the accountability levels of the employees associated with the nodes directly through the graph. Similar to FIG. 2, the sizes of the nodes may depend on the number of direct reports of the employees associated with the nodes. As shown in FIG. 3, node 306 has a larger size than node 304 as a result of more nodes connected with node 306 than node 304, i.e., more employees report to the person associated with node 306 than reporting to the person associated with node 304. Hence, the number of direct reports an employee has may be conveyed through the graphical representation of the sub-organization conveniently.

A group of isolated nodes 314 can also be observed on graph 300. As shown in FIG. 3, the group of nodes 314 is not connected with any other nodes on the graph, representing that the employees associated with the group of nodes 314 are not directly reporting to any person within the sub-organization. This information may be valuable for the high-level managers of the sub-organization because that it may be desirable to limit the number of people disconnected with the other part of the organization from the perspective of organization management. Characteristics of the sub-organization structure can be discovered through the graphical representation. In some implementations, the isolated nodes may be presented in different colors in the graph such that they can be differentiated with other nodes that are connected with the sub-organization.

Figure 4:
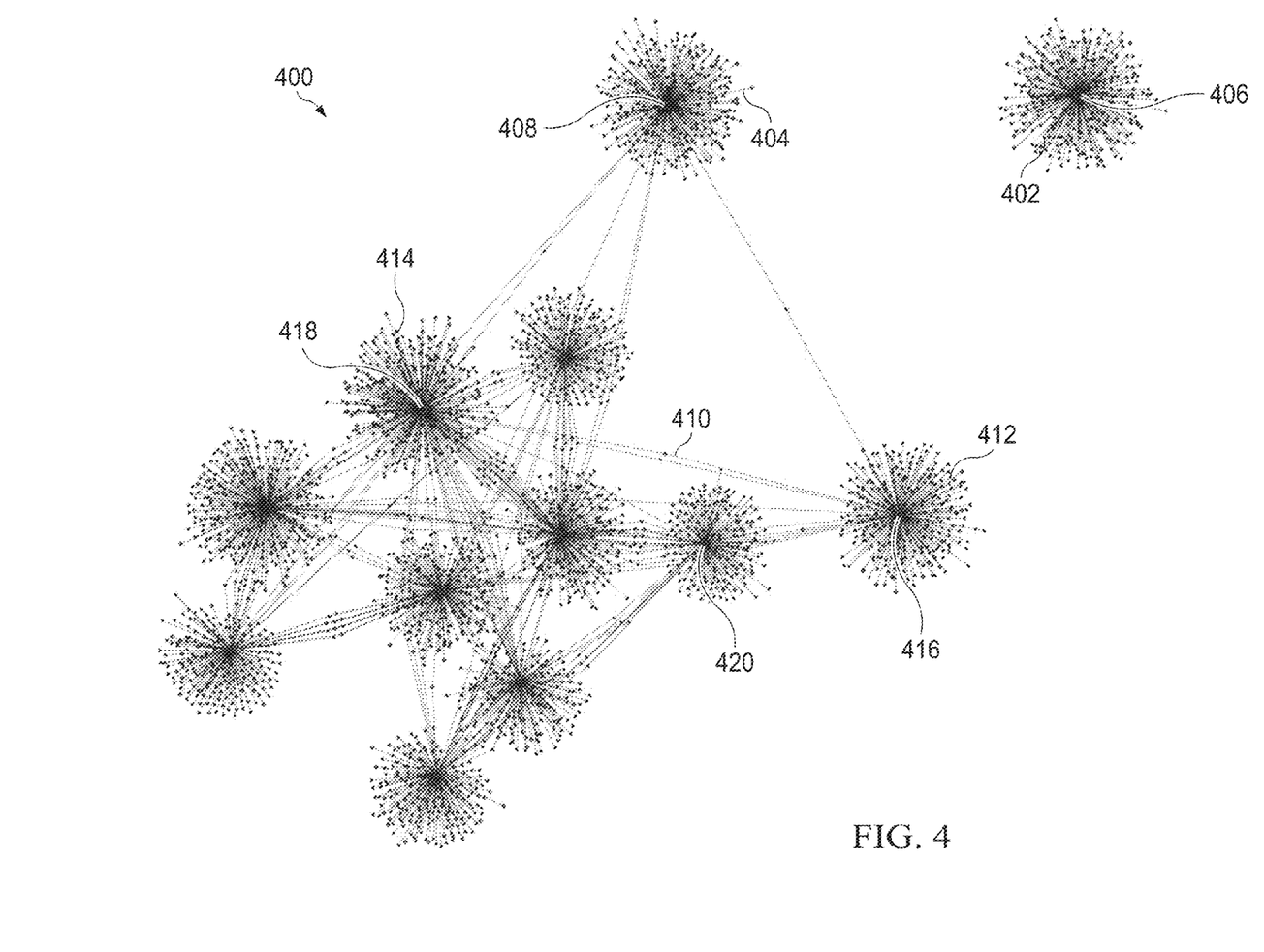
FIG. 4 is an example graph representing employee keywords in a corporate network.

FIG. 4 is an example graph 400 representing employee keywords in a corporate network. As shown in FIG. 4, graph 400 contains a number of node clusters, such as node clusters 402 and 404. In this example graph, the center node in the node cluster (e.g., node 406 and node 408) represents employee keywords. Employees in a corporate network may define their keywords in the corporate address book. The keywords may be defined by the employees as identifications of their corporate role. Although the number of keywords may be large, some keywords may appear more frequently than others and are commonly used by the employees. For example, in an information technology company, commonly used keywords may include project management, customer development, consultant, training, undefined, etc. The keywords that appear frequently may be referred to as abundant keywords. As shown in FIG. 4, the center nodes in the node clusters such as nodes 406 and 408 may each represent an abundant employee keyword. The surrounding nodes in each node cluster represent employees who define their keywords as the keyword associated with the center node in the node cluster. Some employees may define more than one keyword and those are illustrated as nodes placed in between the node clusters, such as the group of nodes 410 between node clusters 412 and 414. When multiple keywords are defined by employees, those keywords are connected together with solid lines. For example, center nodes of clusters 412 and 414, i.e., nodes 416 and 418, are connected in a solid line because the employees associated with the group of nodes 410 define both of the keywords associated with nodes 416 and 418. As shown in FIG. 4, most of the node clusters are connected with each other except node cluster 402, indicating to the user that most of the employee abundant keywords illustrated in graph 400 are connected with each other except for the keyword associated with node 406. The keyword associated with node 406 may be a keyword that identifies a separate role of the corporate network and is substantially disconnected to the rest roles of the corporate network.

It can be seen in FIG. 4 that the center nodes of the node clusters on the graph 400 have different sizes. In this example graph, the size of the center node is based on frequency of appearance with the associated keyword. For example, keywords more frequently selected by the employees may show up in the graph as larger size center nodes than keywords that are less frequently selected by the employees. As shown in FIG. 2, node 406 is of larger size than node 420, indicating that the keyword associated with node 406 is more frequently selected by the employees than the keyword associated with node 420. In other words, the keyword associated with node 406 is relevant to a larger number of employees than the keyword associated with node 420 in the corporate network. In some implementations, different colors may be used for nodes of different sizes, i.e., keywords with different frequencies of appearances may be shown on the graphical representation in different colors. Different colors for the center code and the surrounding node may also be used to improve the visual characterization of the employee keywords. In addition, a different color may be used for nodes placed in between the node clusters which represent employees associated with multiple keywords. In some implementations, the user of the graphical representation can hover over the center node using a mouse pointer or other input interface device. Hovering over the center node can reveal information about the associated keyword (e.g., name of the keyword, the number of employees selecting the keyword, and/or date of the keyword being added or modified). Furthermore, the user of the graphical representation can hover over the surrounding node or the node placed in between the node clusters, using a mouse pointer or other input interface device. Hovering over the surrounding node or the node placed in between the node clusters can reveal information about the associated employee (e.g., name of the employee, title of the employee, department the employee belonging to, direct manager of the employee). Nodes shown on the graph may be moved by the user using an input interface device, such as a mouse or a finger touch or other input, on the graph interface to view node information obscured by other nodes.

Figure 5:
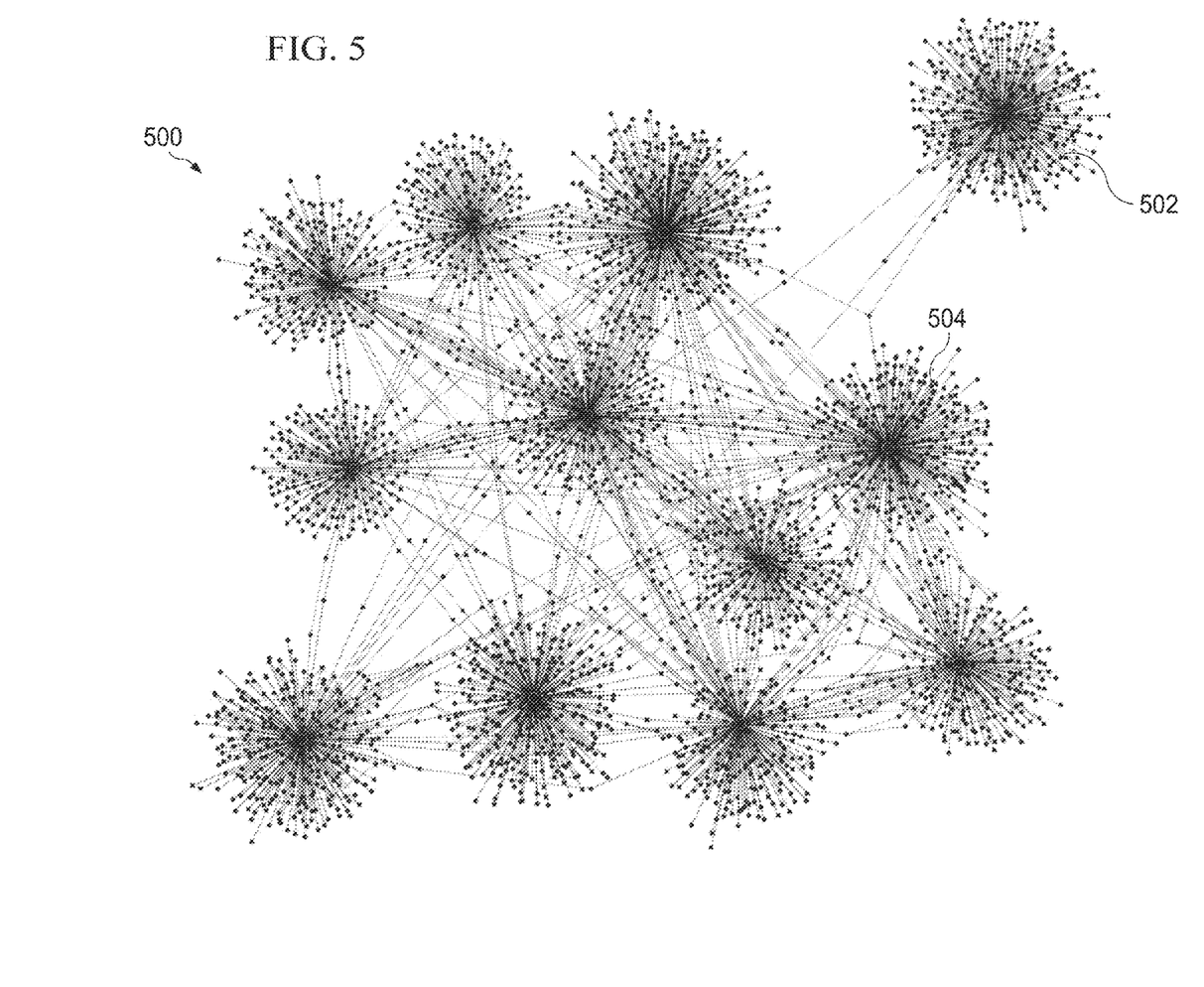
FIG. 5 is an example graph representing multi-layer information of a corporate network.

FIG. 5 is an example graph 500 representing multi-layer information of a corporate network. Both employee keyword information and employee reporting relationships are shown on the graph 500. Similar to FIG. 4, the center node of each node cluster represents an employee keyword and each surrounding node represents an employee who is associated with the keyword. The surrounding nodes are connected with the center node of the node cluster in solid lines. For employees defining multiple keywords, they are represented as nodes placed in between the node clusters. In addition to the employee keywords, the surrounding nodes representing employees are connected to their direct managers on the graph in solid lines. Thus, a surrounding node representing an employee not only connects with the center node of the node cluster, but also connects with another surrounding node that represents the person who the employee directly reports to. The other surrounding node that represents the person the employee directly reports to may or may not locate at the same node cluster as the node representing the employee. For example, node cluster 502 is now connected with other node clusters (e.g., node cluster 504) because some employees associated with node cluster 502 are directly reporting to or managing employees associated with other node clusters (e.g., node cluster 504). If the employee reporting information is not added for the graphical representation, node cluster 502 may be disconnected with other node clusters because that the keyword associated with the center node of node cluster 502 is not selected with other keywords as multiple keywords defined by the employees, i.e., the keyword associated with the center node of node cluster 502 is disconnected with other keywords. Therefore, by including multi-layer corporate information on the graph 500, the node clusters are connected together, rendering a richer graph presentation.

The multi-layer corporate information may include other corporate information instead of or in addition to the employee keywords and reporting relationship, such as project collaboration, activities participation, etc. In some implementations, the user of the graphical representation may also request to add conditions or constraints on the graphical representation. For example, the user may request that only employees at a specific geographical location are shown on the graph. The user may also request that only employees having more than five years working experience are shown on the graph. The data processing module 108 (shown in FIG. 1) may process the corporate data in accordance with the user request or input. The processed corporate data may be transformed into a graphical representation and presented to the user subsequently. Different node sizes may also be used to visualize the number of direct reports an employee has, the frequency of keyword appearance, the number of years of work experience an employee has, the salary level of an employee, etc.

Figure 6:
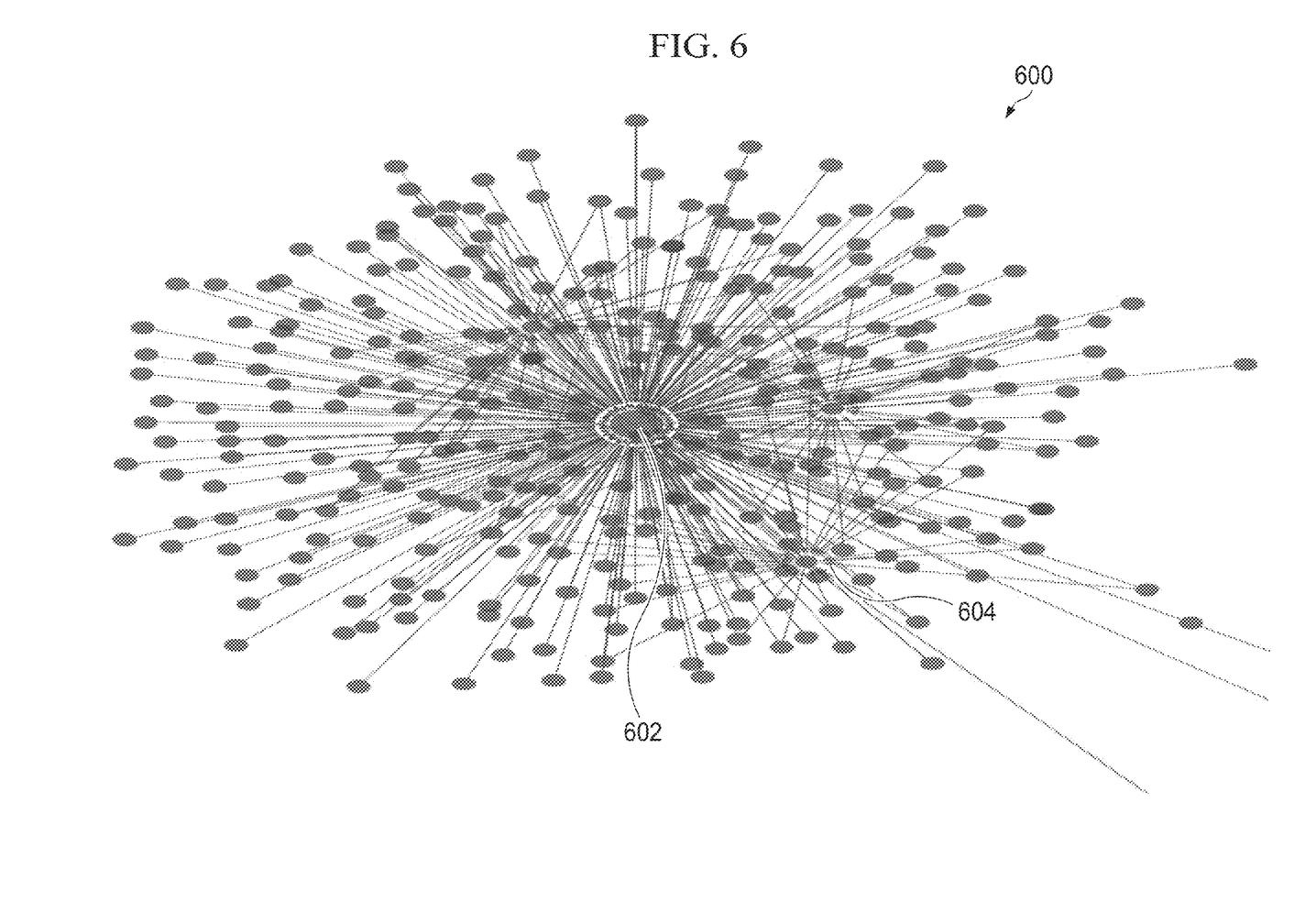
FIG. 6 is another example graph representing multi-layer information of a corporate network.

FIG. 6 is another example graph 600 representing multi-layer information of a corporate network. Graph 600 presents an enlarged view of the graphical representation of employee keywords and reporting relationship. As shown in FIG. 6, the center node 602 in the node cluster represents an employee keyword. The name of the keyword may be shown on the graph attached to the center node 602. In addition, the surrounding nodes in the node cluster represent employees who selected this keyword as one of their keywords. The names of the employees associated with the surrounding nodes may also be shown on graph 600. The surrounding nodes representing employees are connected with the center node representing the employee keyword in solid lines. In addition, the surrounding nodes representing employees are connected with other surrounding nodes that represent their direct managers, using solid lines in this example. In some implementations, colored solid lines may be used to connect the nodes that have the reporting relationship. As shown in FIG. 6, an arrow 604 may be used to point to the node representing the employee's direct manager. In some implementations, different colors may be used for the center node and the surrounding nodes to visualize the different functions the nodes represent. Different types of lines (e.g., solid lines, dashed lines), different colors of lines, or lines of different weights may be used for the lines connecting the surrounding node to the center node representing employee keyword, in comparison to the lines connecting the surrounding node to another surrounding node representing the direct manager. A zoom bar can also be shown on the graphical representation to control the number of nodes shown on each page. The arrangement of nodes and current viewing options selected by the user can be persisted for each instantiation of the graph.

Figure 7:
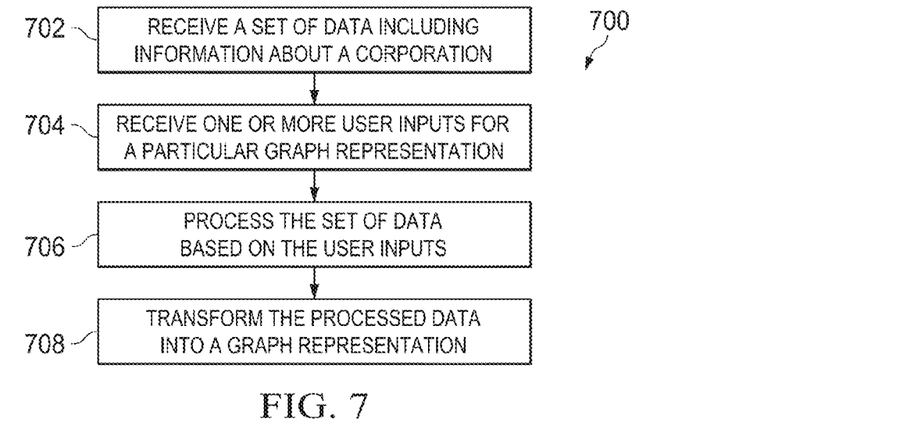
FIG. 7 is a process flow chart for providing a graphical representation of a corporate network.

FIG. 7 is a process flow chart 700 for providing a graphical representation of a corporate network. As shown in FIG. 7, the server 102 (shown in FIG. 1) may receive a set of data including information about a corporation at 702. The corporation information may include organizational reporting structure, employee data, customer data, etc. The server may retrieve the corporate data from an internal corporate system such as a human resource system, a customer relationship management system, etc. The server may receive one or more user inputs for a particular graphical representation at 704. The user inputs may set conditions or constraints for the graphical representation. For example, the user inputs may include requests to only present employees at a certain geographical location for the graphical representation. The user inputs may specify a sub-organization of the corporation for the graphical representation. Further, the user inputs may define the type of corporate data the user is interested, e.g., employee keywords, employee reporting structure, employee salaries, etc. The user inputs may also include requests to use a particular color or background for the graphical representation. The server 102 may subsequently process the set of data based on the received user inputs at 706. In some implementations, the server 102 may filter out irrelevant data based on the received user inputs. The server 102 may remove invalid data from the set of data received from an internal corporate system. The server 102 may also convert the data formats in the set of data received from an internal corporate system to data formats that are compatible with the software or hardware application that generates the graphs. Moreover, the server 102 may combine corporate data received from different systems or sources to a unified set of data for graphical representation purposes. After processing the corporate data based on user inputs, the server 102 may transform the processed data into a graphical representation at 708. Although the illustrated process flow chart 700 is shown at the server, it may be executed by a client computer, a mobile device, a local client computer connected with the server, or any other computing system.

By transforming information related to a corporate network into a graphical representation, a user may readily understand the corporate culture, identify outstanding phenomena associated with the corporate network, and apply network analysis on the graphical representation to gain insights about the corporation. The graphical representation may be adapted according to user requests to provide customized presentations to the user. Therefore, business intelligence of corporate networks may be achieved through transforming the corporate data into a graphical representation.

A number of implementations of the disclosure have been described. Nevertheless, it will be understood that various modifications may be made without departing from the spirit and scope of the disclosure. Accordingly, other implementations are within the scope of the following claims.

What is claimed is:
1. A computer implemented method for corporate data analysis, comprising:

receiving, by a processor and from a computer-readable memory that stores corporate data storing information about a corporation, a set of data that identifies employees of the corporation, the set of data including information about keywords defined by employees;

in response to input, transforming, by the processor, the set of data into a first graphical representation including nodes whose properties are based on the set of data, wherein the nodes represent respective employees of the corporation;

displaying, by the processor, the graph representation including the nodes, wherein a first node representing a first employee is connected to a second node representing a second employee who directly reports to the first employee under a corporate structure of the corporation, and wherein a size of the first node corresponds to a number of employees that directly report to the first employee;

in response to input, transforming, by the processor, the set of data into a second graphical representation including nodes whose properties are based on the set of data, wherein a subset of nodes in the second graphical representation represent the keywords associated with the employees and another subset of nodes in the second graphical representation represent employees; and displaying the second graphical representation including the nodes, wherein a fourth node representing a keyword is connected to a fifth node representing a fifth employee who has defined the keyword, wherein the keyword represents a role in the corporation, and wherein a size of the fourth node corresponds to a frequency with which employees define the keyword represented by the fourth node.

2. The method of claim 1, wherein the graphical representation includes at least one visible organizational anomaly.

3. The method of claim 2, wherein the at least one visible organizational anomaly includes a subset of nodes that are not connected to any other node in the graph representation indicating that a subset of employees represented by the subset of nodes do not directly report to any other employee of the corporation.

4. The method of claim 2, wherein the at least one visible organizational anomaly includes a third node representing a third employee having a significantly larger size relative to other nodes representing other employees indicating that significantly more number of employees directly report to the third employee relative to other employees to whom employees report.

5. The method of claim 1, wherein the graphical representation includes multi-layer corporate information.

6. The method of claim 5, wherein the multi-layer corporate information includes employee reporting information and employee keywords information.

7. The method of claim 1, wherein receiving the set of data comprises retrieving the set of data from a corporate database internal to the corporation.

8. The method of claim 1, wherein the graphical representation is a first graphical representation, wherein the set of data includes information about keywords defined by employees, and wherein the method further comprises:

in response to input, transforming the set of data into a third graphical representation including nodes, wherein a subset of nodes in the second graphical representation represent the keywords associated with employees and another subset of nodes in the second graphical representation represent employees; and displaying the third graphical representation including the nodes, wherein a sixth node representing a keyword is connected to a seventh node representing a seventh employee who has defined the keyword, and wherein the seventh node is connected to an eighth node representing an eighth employee to whom the seventh employee directly reports.

9. The method of claim 1, further comprising receiving the input for a particular graphical representation prior to transforming the set of data into the graphical representation.

10. The method of claim 9, wherein receiving the input comprises receiving the input through a user interface in which the graphical representation is displayed.

11. A non-transitory computer-readable medium storing instructions executable by one or more processors to perform operations comprising:

receiving a set of data including information about employees of a corporation and keywords defined by the employees; and in response to input, transforming the set of data into a graphical representation including a first subset of nodes that represent the employees of the corporation and a second subset of nodes that represent the keywords defined by the employees, wherein a first node in the first subset that represents a first employee is connected to a second node in the second subset that defines a first keyword defined by the first employee, wherein a keyword represents a role in the corporation, and wherein a size of a particular node in the second subset represents a frequency with which employees define a keyword represented by the particular node.

12. The medium of claim 11, wherein the graphical representation includes at least one visible organizational anomaly.

13. The medium of claim 12, wherein the at least one visible organizational anomaly includes one or more nodes that represent the employees and that are not connected to any other node in the first subset of nodes indicating that the one or more employees represented by the one or more nodes do not directly report to any other employee of the corporation.

14. The medium of claim 12, wherein the at least one visible organizational anomaly includes a node in the first subset having a significantly larger size relative to other nodes in the first subset indicating that significantly more number of employees directly report to an employee represented by the node in the first subset having the significantly larger size.

15. The medium of claim 11, wherein the graphical representation includes multi-layer corporate information.

16. The medium of claim 15, wherein the multi-layer corporate information includes employee reporting information and employee keywords information.

17. The medium of claim 11, wherein receiving the set of data comprises retrieving the set of data from a corporate database internal to the corporation.

18. The medium of claim 11, wherein the graphical representation is a first graphical representation, and wherein the operations further comprise:

in response to input, transforming the set of data into a second graphical representation including the first subset of nodes and the second subset of nodes; and displaying the second graphical representation including the first subset of nodes and the second subset of nodes, wherein a third node representing a second keyword is connected to fourth node representing a second employee who has defined the second keyword, and wherein the fourth node is connected to a fifth node representing a third employee to whom the second employee directly reports.

19. The medium of claim 11, the operations further comprising receiving the input for a particular graphical representation prior to transforming the set of data into the graphical representation.

20. The medium of claim 19, wherein receiving the input comprises receiving the input through a user interface in which the graphical representation is displayed.

21. A system comprising:
   one or more processors; and
   a computer-readable medium storing instructions executable by one or more processors to perform operations comprising:
      receiving a set of data including information about employees of a corporation and keywords defined by the employees; and
      in response to input, transforming the set of data into a graphical representation including a first subset of nodes that represent the employees of the corporation and a second subset of nodes that represent the keywords defined by the employees, wherein a first node in the first subset that represents a first employee is connected to a second node in the second subset that defines a first keyword defined by the first employee, wherein a keyword represents a role in the corporation, and wherein a size of a particular node in the second subset represents a frequency with which employees define a keyword represented by the particular node.

* * * * *